United States Patent
Le Taillandier De Gabory

(10) Patent No.: US 10,225,017 B2
(45) Date of Patent: Mar. 5, 2019

(54) OPTICAL TRANSMITTER AND METHOD FOR CONTROLLING THE SAME

(71) Applicant: NEC Corporation, Minato-ku, Tokyo (JP)

(72) Inventor: Emmanuel Le Taillandier De Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 169 days.

(21) Appl. No.: 15/300,378

(22) PCT Filed: Apr. 15, 2014

(86) PCT No.: PCT/JP2014/002119
§ 371 (c)(1),
(2) Date: Sep. 29, 2016

(87) PCT Pub. No.: WO2015/159318
PCT Pub. Date: Oct. 22, 2015

(65) Prior Publication Data
US 2017/0149507 A1    May 25, 2017

(51) Int. Cl.
*H04B 10/00* (2013.01)
*H04B 10/50* (2013.01)
(Continued)

(52) U.S. Cl.
CPC . *H04B 10/50575* (2013.01); *H04B 10/50595* (2013.01); *H04B 10/5161* (2013.01); *H04L 27/2623* (2013.01)

(58) Field of Classification Search
CPC .......... H04B 10/50575; H04B 10/5161; H04L 27/2623
(Continued)

(56) References Cited

U.S. PATENT DOCUMENTS

2006/0189511 A1* 8/2006 Koblish ............. A61K 31/5513
514/221
2008/0239448 A1  10/2008 Tanaka et al.
(Continued)

FOREIGN PATENT DOCUMENTS

EP  1975693 B1  12/2009
EP  2624484 A1  8/2013
(Continued)

OTHER PUBLICATIONS

R. Schmogrow et al., "Real-Time Software-Defined Multiformat Transmitter Generating 64QAM at 28 GBd", IEEE Photonics Technology Letters, vol. 22, No. 21, pp. 1601-1603, Nov. 1, 2010.
(Continued)

*Primary Examiner* — Tesfaldet Bocure

(57) ABSTRACT

To improve the signal quality of the optical signal emitted by a reconfigurable transmitter after a reconfiguration event, an optical transmitter includes a modulator, a digital signal processor, and a controller. The modulator is for modulating light by a driving signal with a reconfigurable format. The digital signal processor is for processing digital data to be transmitted by using parameters in order to generate the driving signal. The controller is for controlling the digital signal processor changing the parameters so as to keep the driving signal stable before and after changing the reconfigurable format.

13 Claims, 10 Drawing Sheets

(51) Int. Cl.
*H04B 10/516* (2013.01)
*H04L 27/26* (2006.01)

(58) Field of Classification Search
USPC .......... 398/193; 375/285, 295, 296, 297
See application file for complete search history.

(56) References Cited

U.S. PATENT DOCUMENTS

| | | |
|---|---|---|
| 2011/0299858 A1 | 12/2011 | Mazzini et al. |
| 2013/0202315 A1 | 8/2013 | Akiyama et al. |
| 2015/0236792 A1 | 8/2015 | Sugihara et al. |

FOREIGN PATENT DOCUMENTS

| | | |
|---|---|---|
| JP | 2008-249848 A | 10/2008 |
| JP | 2013-160956 A | 8/2013 |
| WO | 2013/179528 A1 | 12/2013 |
| WO | 2014/041629 A1 | 3/2014 |

OTHER PUBLICATIONS

H. Kawakami et al., "Auto Bias Control Technique Based on Asymmetric Bias Dithering for Optical QPSK Modulation", Journal of Lightwave Technology, vol. 30, No. 7, pp. 962-968, Apr. 1, 2012.
Amr M. Ragheb et al., "Up to 64 QAM/32 Gbaud flexible dual polarization transmitter for future elastic optical networks", Optical Engineering, Soc. of Photo-Optical Instrumentation Engineers, Bellingham, vol. 52, No. 11, Nov. 1, 2013, p. 115102, XP060025651.
International Search Report for PCT Application No. PCT/JP2014/002119, dated May 2, 2015.
English translation of Written opinion for PCT Application No. PCT/JP2014/002119.
Japanese Office Action for JP Application No. 2016-558417 dated Oct. 31, 2017 with English Translation.

* cited by examiner

OPTICAL TRANSMITTER AND METHOD FOR CONTROLLING THE SAME

This application is a National Stage Entry of PCT/JP2014/002119 filed on Apr. 15, 2014, the content of which is incorporated herein by reference, in its entirety.

TECHNICAL FIELD

The present invention relates to optical transmitters and methods for controlling an optical transmitter and, in particular, to an optical transmitter and a method for controlling an optical transmitter using digital signal processing techniques.

BACKGROUND ART

Digital Signal Processing (DSP) techniques enable to compensate the impairments affecting optical signals during transmission in an optical fiber by applying the inverse filter properties of the impairments. This enables the transmission of higher rate channels on longer reach. These techniques can be applied at a receiver receiving a light wave signal through a medium such as an optical fiber. Notably, coherent reception enables to get the information on both phase and amplitude of the received signal. In this way, the DSP compensates the impairments occurring during transmission, before reception, by using digital filters. Signal equalization is realized with a DSP implemented in a signal processor. Besides, using digital signal processing enables the demodulation of multilevel signals such as Quadrature Amplitude Modulation (QAM) signals, which enables to increase the capacity of an optical fiber link. The reception of 16QAM signal is realized with digital processing in the receiver.

However, the benefits of the digital processing are not limited to the application of this technique at the receiver end. DSP techniques combined with Digital to Analog Converter (DAC) can be applied at the transmitter side. In such a case, the transmitter, which is called a digital transmitter hereafter, includes a DSP processor and a DAC to convert digital signals into analog signals used to drive an IQ modulator.

In such a manner, a DSP of a digital transmitter can be used to pre-compensate at the transmitter side for linear impairments appearing during transmission in the fiber such as chromatic dispersion (CD). Independently, a transmitter can be used to generate complex modulation formats such as but not limited to QAM signals.

The configuration and the setting of the transmitter can be changed at startup, during the operation to accommodate optimized reach and bandwidth allocation in the network, or in changing transmission routes inside dynamic networks. An example of a reconfigurable digital transmitter which is called a software defined transmitter and is capable of emitting signals chosen from eight different formats is described in the non patent literature 1 (NPL1). Here, reconfigurable transmitters require changing their transmission formats at high speed. Namely, the data loss at the configuration changing must be avoided because the transmission link would not be operable in such a case. For instance, the changes in the characteristics of the transmission line, which are caused by external elements, degradation of equipment or working conditions, or path reconfiguration, would trigger the reconfiguration of modulation format or pre-distortion configuration. This can be done with the reconfigurable transmitter described in NPL1, for example. However, such a reconfiguration must be realized without data loss.

The modulation in a digital transmitter can be performed with an optical IQ modulator, which is sometimes called Cartesian modulator, vector modulator, Dual Parallel modulator, or nested modulator depending on the sources. In an IQ modulator, the electric signals drive two independent Mach-Zehnder devices, which can be called children Mach-Zehnder Modulators (MZMs). The children MZMs modulate the phase and amplitude of the same optical carrier and their outputs are relatively phase delayed by 90 degrees before being recombined. These components are called In Phase (I) and Quadrature Phase (Q) of the signal. The phase difference between the outputs of the children MZMs can be called the angle of quadrature and is equal to 90 degrees ideally. Such an IQ modulator is used in the transmitter described in NPL1. In the case of a reconfigurable transmitter illustrated in NPL1 for example, the driving signal of the IQ modulator is changed according to the set modulation format or the pre-distortion configuration.

However, it is known that there is a drift of the DC (Direct Current) bias in the IQ modulator due to the variation of the temperature or the ageing of the device. There are three types of affected biases, that is, the DC bias of each of the two children MZMs and a DC bias used to set the angle of quadrature. This causes a degradation of the transmitted signal, and therefore results in the degradation of the received signal quality or in worst cases the impossibility to decode the received signal. This problem is likely to be revealed in the characterization tests of the modulator at the production stage or at the assembly stage of the transmitter in which the modulator is used, and when it is used. This problem can be solved by using Auto Bias Control (ABC) circuits, which control the biases of the modulators and compensate the DC bias change. In this manner, the ABC technology can manage the drift of DC bias of the IQ modulator and enables a correct modulation in the optimal condition.

An example of an ABC circuit is illustrated in the non patent literature 2 (NPL2). The ABC circuit illustrated in NPL2 is based on low frequency dither tones to control the DC biases of the children MZMs of I and Q components as well as the angle of quadrature. The reported convergence time of the ABC circuit is 1 minute. It is sufficient to track variations of environmental temperatures or the degradation of the device. Making this convergence time faster would be possible, but the order of magnitude of the convergence time would not change because the ABC is based on a low frequency tone. Furthermore, very fast ABC tracking of DC biases, which change due to slow environmental temperature changes or slow device ageing, would result in an unstable feedback.

CITATION LIST

Non Patent Literature

[NPL 1]

R. Schmogrow et al., "Real-Time Software-Defined Multi-format Transmitter Generating 64QAM at 28 GBd", IEEE Photonics Technology Letters, Vol. 22, No. 21, pp. 1601-1603, Nov. 1, 2010.

[NPL 2]

H. Kawakami et al., "Auto Bias Control Technique Based on Asymmetric Bias Dithering for Optical QPSK Modulation", Journal of Lightwave Technology, Vol. 30, No. 7, pp. 962-968, Apr. 1, 2012.

SUMMARY OF INVENTION

Technical Problem

A reconfigurable transmitter such as the transmitter illustrated in NPL1 emits different signal configurations including different modulation format settings or pre-distortion settings. The reconfigurable transmitter drives the IQ modulator which modulates its optical signal with different electrical signals. This means that the driving signal have different peak to average ratio (PAPR), different amplitudes, and different effective voltages.

The differences in driving voltage cause different values of power dissipation as heat inside the modulator. Moreover, the IQ modulator includes sensitive interferometers such as Mach-Zehnder type and phase adjustment sections for the quadrature (IQ) angle. These parts will be affected by the differences in power dissipation which is caused by the differences in DC bias voltages for different driving signals. The ABC is able to compensate these differences in bias voltages.

However, in the case of a reconfigurable transmitter such as the one illustrated in NPL1 with very fast reconfiguration time or no data loss, the optimal DC biases will be changed when its configuration is changed. Although the phenomenon is linked to power dissipation, it is notably faster than the drift caused by environmental temperature changes because it is limited to the space inside the package of the modulator. Therefore the ABC is not able to compensate instantaneously the bias drift caused by the reconfiguration of the transmitter. As a result, after the reconfiguration and during a time interval comparable to the convergence time of an ABC, that is, one minute for the ABC in NPL2, the DC bias of the IQ modulator will not become optimal and signal degradation will appear during this interval. In the worst case, the margin of the operation of the transmitter may be reduced, which can result in the loss of data within this interval.

As mentioned above, there is a problem that it is necessary to improve the signal quality of the optical signal emitted by a reconfigurable transmitter after a reconfiguration event.

An exemplary object of the invention is to provide an optical transmitter and a method for controlling the same which solve the above-mentioned problem that it is necessary to improve the signal quality of the optical signal emitted by a reconfigurable transmitter after a reconfiguration event.

Solution to Problem

An optical transmitter according to an exemplary aspect of the invention includes a modulation means for modulating light by a driving signal with a reconfigurable format; a digital signal processing means for processing digital data to be transmitted by using parameters in order to generate the driving signal; and a control means for controlling the digital signal processing means by means of changing the parameters so as to keep the driving signal stable before and after changing the reconfigurable format.

A method for controlling an optical transmitter according to an exemplary aspect of the invention includes the steps of: modulating light by a driving signal with a reconfigurable format; processing digital data to be transmitted by using parameters in order to generate the driving signal; and controlling the step of processing digital data by means of changing the parameters so as to keep the driving signal stable before and after changing the reconfigurable format.

Advantageous Effects of Invention

An exemplary advantage according to the present invention is that it becomes possible to obtain optical signals with the optimal quality after a reconfiguration event of a reconfigurable transmitter.

DESCRIPTION OF EMBODIMENTS

The exemplary embodiments of the present invention will be described with reference to drawings below.

[The First Exemplary Embodiment]

Figure 1:
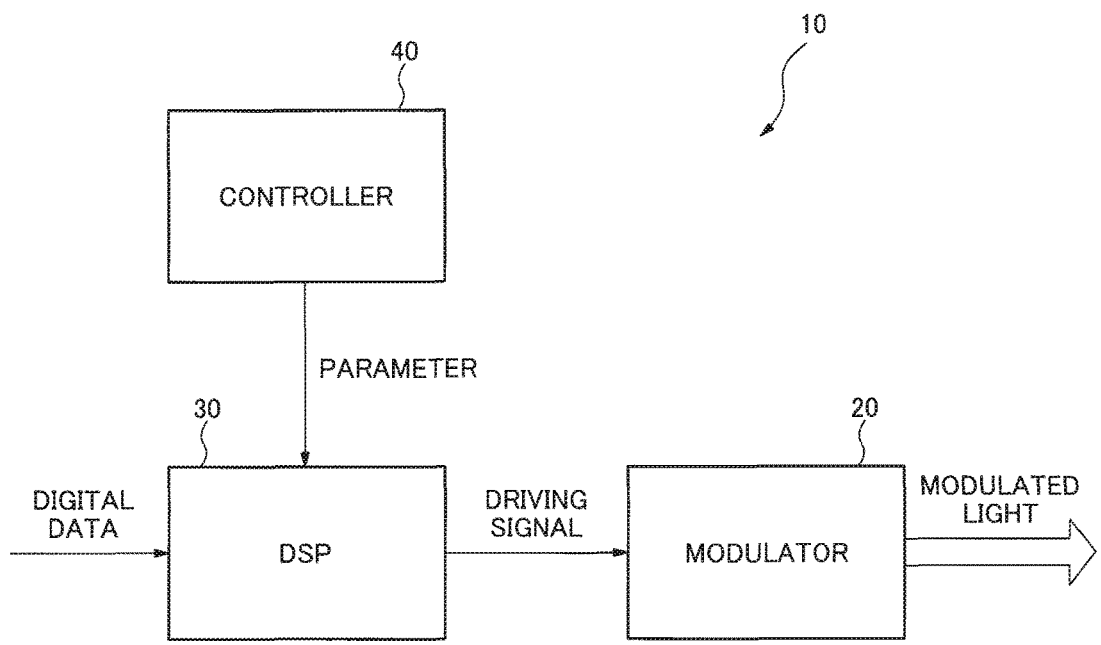
FIG. 1 is a block diagram showing the configuration of an optical transmitter in accordance with the first exemplary embodiment of the present invention.

FIG. 1 is a block diagram showing the configuration of an optical transmitter in accordance with the first exemplary embodiment of the present invention. The optical transmitter 10 includes a modulator 20 as a modulation means, a digital signal processing (DSP) unit 30 as a digital signal processing means, and a controller 40 as a control means.

The modulator 20 modulates light by a driving signal with a reconfigurable format. The DSP unit 30 processes digital data to be transmitted by using parameters in order to generate the driving signal. The controller 40 controls the DSP unit 30 by means of changing the parameters so as to keep the driving signal stable before and after changing the reconfigurable format.

By adopting the configuration mentioned above, according to the optical transmitter 10 of the present exemplary embodiment, it becomes possible to obtain optical signals with the optimal quality after a reconfiguration event of a reconfigurable transmitter.

The optical transmitter 10 can include a lookup table which stores the parameters. Alternatively, the optical transmitter 10 can include a calculation unit as a calculation means which calculates the parameters to be applied after changing the reconfigurable format depending on the parameters having been applied before changing the reconfigurable format. The parameters can include a multiplying coefficient and a clipping ratio for the digital data.

Next, a method for controlling an optical transmitter in accordance with the present exemplary embodiment will be described.

In the method for controlling the optical transmitter, light is modulated by a driving signal with a reconfigurable format. Digital data to be transmitted are processed by using parameters in order to generate the driving signal. The step of processing digital data is controlled by means of changing the parameters so as to keep the driving signal stable before and after changing the reconfigurable format.

According to the above-mentioned method for controlling the optical transmitter, it becomes possible to obtain optical signals with the optimal quality after a reconfiguration event of a reconfigurable transmitter.

[The Second Exemplary Embodiment]

Figure 2:
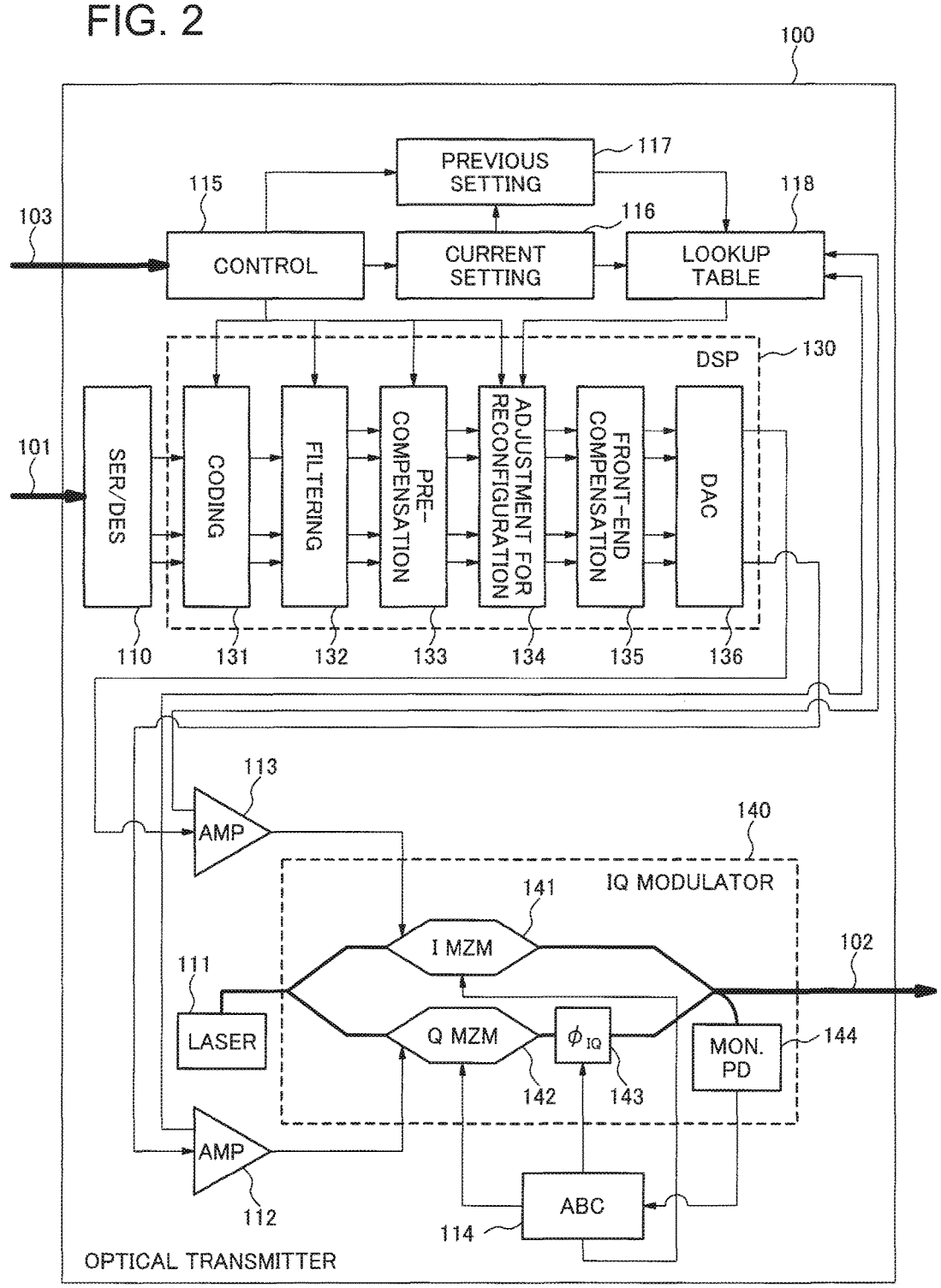
FIG. 2 is a block diagram showing the configuration of an optical transmitter in accordance with the second exemplary embodiment of the present invention.

Next, the second exemplary embodiment of the present invention will be described. FIG. 2 is a block diagram showing the configuration of an optical transmitter 100. The optical transmitter 100 emits an optical signal 102 according to a logical binary stream 101. The modulation format of the optical signal 102 can be selected among a plurality of modulation formats. In addition, the spectral shape of the optical signal 102 can be selected among a plurality of spectral shapes. The selected modulation format and the selected spectral shape are provided for the optical transmitter 100 through a signal 103.

The logical binary stream 101 may be composed of several lower rate tributaries. A serializer/deserializer 110 converts the logical binary stream 101 into several parallel bit streams, which are fed into a DSP unit 130. The DSP unit 130 processes the data output by the serializer/deserializer 110 in order to generate two analog signals which are respectively amplified by drivers 112 and 113. The outputs of the respective drivers 112 and 113 are used for modulating the light emitted by a laser 111 with an IQ modulator 140.

The IQ modulator 140 includes two children Mach-Zehnder modulators (MZMs) 141 and 142, which modulate the light according to the respective outputs of the drivers 112 and 113. The modulated light is used as in phase (I) component and quadrature phase (Q) component of the lightwave signal, respectively. A phase adjustment section 143 generates a quadrature angle of 90 degrees between the modulated I and Q components. The IQ modulator 140 also includes a monitor photodiode (PD) 144, which receives a tapped portion of the output light of the IQ modulator 140. The monitor PD 144 generates an electrical monitor signal, which is used by an ABC circuit 114 in order to control three DC biases of the IQ modulator 140, namely the bias for the I child MZM 141, the bias for the Q child MZM 142, and the bias for the IQ phase adjustment section 143.

The DSP unit 130 includes a coding section 131, which generates signals according to the output of the serializer/deserializer 110 and the selected modulation format corresponding to the signal emitted by a control unit 115 as a function of the signal 103. For instance, the coding section 131 can generate digital signals for the modulation according to QPSK (Quadrature Phase Shift Keying) format, 8QAM format, 16QAM format, or 64QAM. In addition, the coding section 131 can generate the data so that the optical signal 102 may be formed in NRZ (Non Return to Zero) format or RZ (Return to Zero) format.

The output of the coding section 131 is processed by a digital filter 132. The digital filter 132 can filter digital signals in frequency domain in order to generate Nyquist pulse shaping for the optical signal 102. The setting of the digital filter 132 is made according to a corresponding signal emitted by the control unit 115 as a function of the signal 103.

The output of the digital filter 132 is processed by a pre-compensation unit 133, which performs pre-compensation of impairments affecting the signal in the transmission line. For instance, the pre-compensation unit 133 can perform a pre-compensation process for chromatic dispersion (CD) by filtering in the frequency domain the digital signal with the frequency response of the opposite value to the CD to be compensated. The pre-compensation unit 133 can also perform a pre-compensation process for nonlinear impairments. The setting parameters of the pre-compensation unit 133 are controlled by the control unit 115, which sets the parameters of the pre-compensation depending on the information on the transmission line where the optical signal 102 is transmitted.

An adjustment unit 134 performs multiplication and clipping on the digital signal output by the pre-compensation unit 133. The parameters of the adjustment unit 134 are changed when the control unit 115 orders the reconfiguration of the optical transmitter 100. The order for the reconfiguration includes changing the selected modulation format and the selected filtering format. The set parameters are passed to the adjustment unit 134 by a lookup table 118.

The output of the adjustment unit 134 is processed by a front-end compensation unit 135, which compensates the imperfections of the optical front-end of the optical transmitter 100. The front-end compensation unit 135 can compensate the bandwidth limitation and the nonlinearity of a DAC 136, the drivers 112 and 113, and the IQ modulator 140. The digital signals output by the front-end compensation unit 135 are converted into analog signals by the DAC 136. Two independent analog signals converted by the DAC 136 are amplified by the drivers 112 and 113 in order to modulate the light emitted by a laser 111 with the IQ modulator 140.

The control unit 115 sets the modulation format and filtering characteristics of the optical transmitter 100 according to the signal 103. The signal 103 is susceptible to a change depending on the transmission characteristics of the transmission line through which the optical signal 102 is transmitted, on the network condition, or on the conditions of the optical transmitter 100 or a receiver receiving the optical signal 102.

When the signal 103 is changed, the control unit 115 can reconfigure the optical transmitter 100. When such a reconfiguration event occurs, the information on the new setting, including the information on the selected modulation format and the selected filtering format, is stored in a memory 116. The setting which has been stored in the memory 116 before the event is passed though another memory 117. The lookup table 118 selects a setting among the setting list which is stored on non-volatile memory tables, depending on entries provided by the information stored in the memory 116 and the memory 117. The values stored in the lookup table 118 are recorded during the manufacturing process of the optical transmitter 100. The control unit 115, the memories 116 and 117, and the lookup table 118 can be integrated in the DSP unit 130.

The information stored in the lookup table 118 and passed to the adjustment unit 134 is changed when a reconfiguration event occurs. This information includes a multiplying coefficient and a clipping ratio, which are used to process the digital signals output by the pre-compensation unit 133.

The coefficients of the lookup table 118 are chosen so that the average of the absolute voltage of the electrical signals output by the drivers 112 and 113 may become equal before and after the reconfiguration event.

In an alternative implementation of the present exemplary embodiment, the coefficients of the lookup table 118 are chosen so as to reduce the difference between the average of the absolute voltage of the electrical signals output by the drivers 112 and 113 before and after the reconfiguration event.

In an alternative implementation of the present exemplary embodiment, the coefficients of the lookup table 118 are chosen so that the average of the square values of voltages of the electrical signals emitted by the drivers 112 and 113 may become equal before and after the reconfiguration event.

In an alternative implementation of the present exemplary embodiment, the memories 116 and 117 also store the information on the setting of the pre-compensation unit 133. The values of the lookup table 118 are chosen depending on entries chosen from the values stored in the memories 116 and 117.

In an alternative implementation of the present exemplary embodiment, the drivers 112 and 113 include means to monitor their output. Depending on the variation of the average voltage of the drivers 112 and 113 due to ageing of the drivers 112 and 113 or to changing in the environmental temperature of the optical transmitter 100 for instance, and monitoring the output with the monitoring means, the coefficients of the lookup table 118 are updated proportionally to the variations of the output characteristics of the drivers 112 and 113.

Next, a method for controlling the optical transmitter 100 will be described, referring to FIG. 3.

Figure 3:
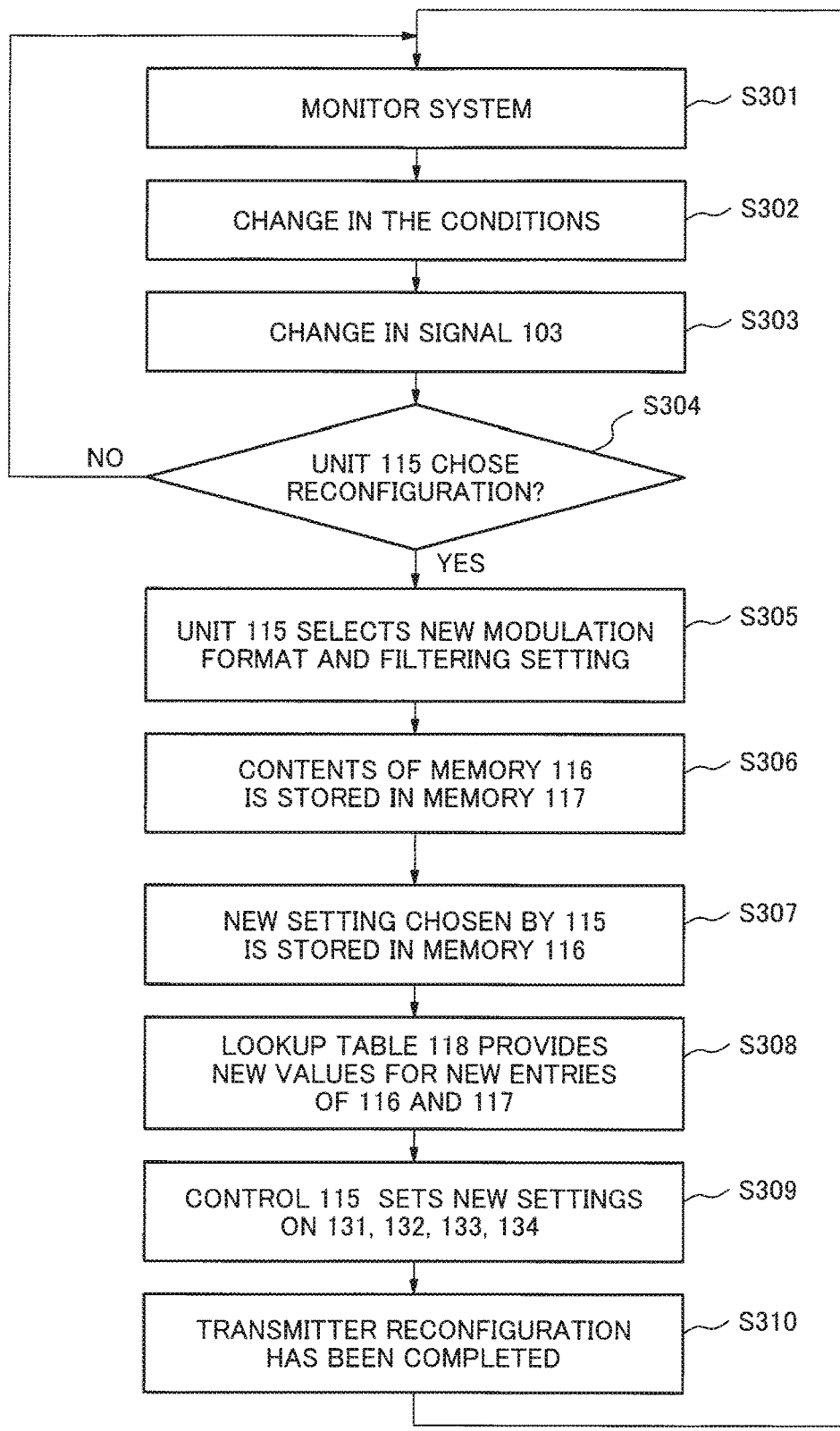
FIG. 3 is a flowchart illustrating a method for controlling the optical transmitter in accordance with the second exemplary embodiment of the present invention.

FIG. 3 is a flowchart illustrating a method for controlling the optical transmitter 100. In step S301, the system using the optical transmitter 100 has continuously been monitored until an event occurs at step S302. The event causes a change in the condition of the network in which the optical transmitter 100 is used. In step S303, according to the change of step S302, the signal 103 provided for the optical transmitter 100 by the network is changed.

Next, in step S304, the control unit 115 analyzes the signal 103 and decides whether or not it is necessary to reconfigure the optical transmitter 100. If the control unit 115 decides that a reconfiguration of the optical transmitter 100 is unnecessary (S304/NO), the system is being monitored again at step S301. In the case where a reconfiguration is necessary (S304/YES), in step S305, the control unit 115 choses new modulation format and filtering setting to accommodate the optical transmitter 100 to the change in the conditions of step S302.

Then, according to step S306, the contents of the memory 116 is copied into the memory 117. According to step S307, the new settings chosen by the control unit 115 at step S305 are stored in the memory 116. In step S308, since the entries of the lookup table 118 have changed according to steps S306 and S307, the values provided by the lookup table 118 are changed.

Then, in step S309, the control unit 115 reconfigures the optical transmitter 100 through the units 131, 132, and 133 in the DSP unit 130 according to the selected values. According to the present exemplary embodiment, the control unit 115 also orders the adjustment unit 134 to use the new values provided by the lookup table 118 to process the digital signal according to which the optical signal 102 is generated. According to the adjustment unit 134 and the new values chosen at step S309, the optical signal 102 becomes optimal at the reconfiguration step S309 and in the subsequent time. Finally, at step S310, the reconfiguration has been completed and the system is being monitored again in step S301.

[The Third Exemplary Embodiment]

Figure 4:
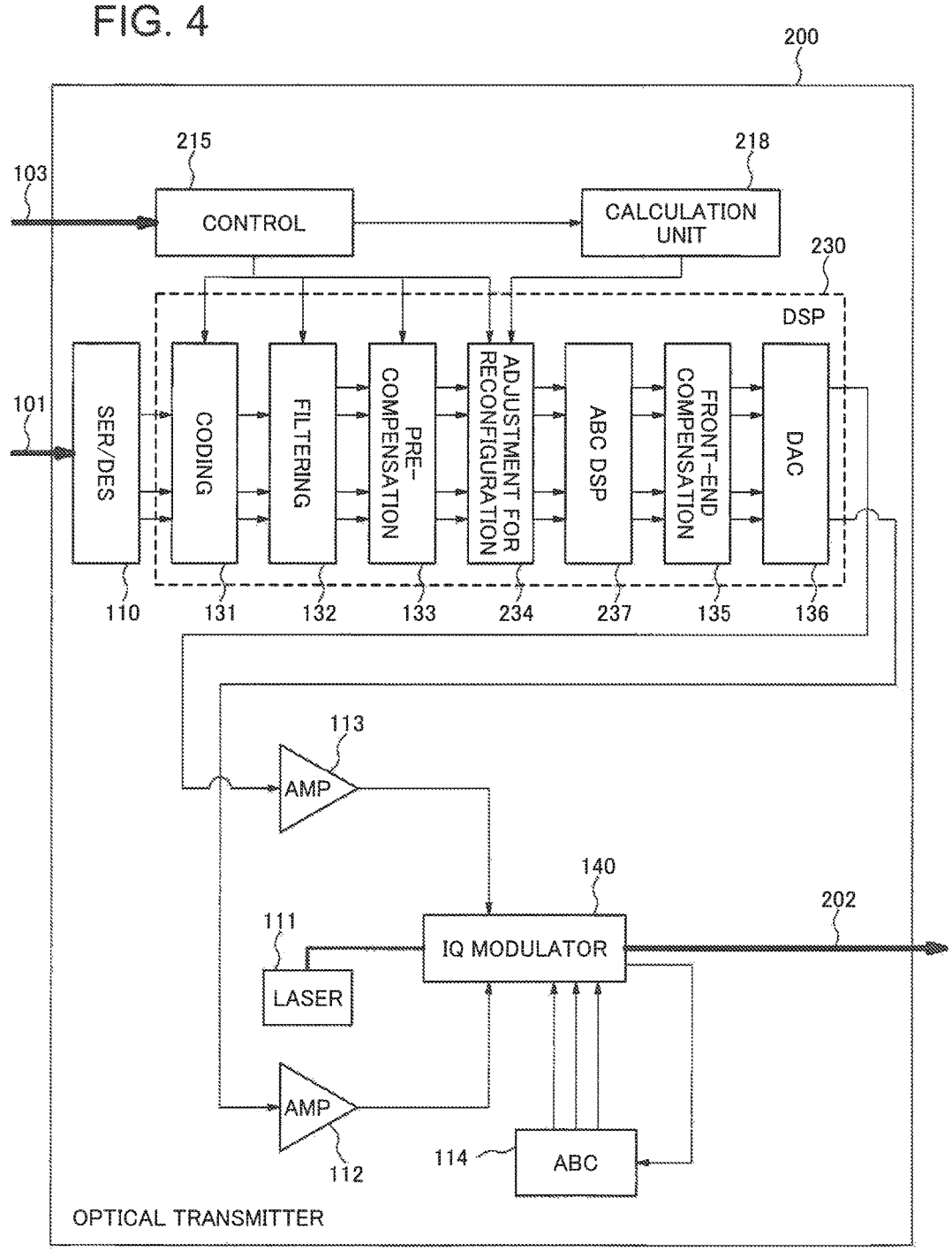
FIG. 4 is a block diagram showing the configuration of an optical transmitter in accordance with the third exemplary embodiment of the present invention.

Next, the third exemplary embodiment of the present invention will be described. FIG. 4 is a block diagram showing the configuration of an optical transmitter 200. The optical transmitter 200 emits an optical signal 202 according to the logical binary stream 101. The modulation format of the optical signal 202 can be selected among a plurality of modulation formats. In addition, the spectral shape of the optical signal 202 can be selected among a plurality of spectral shapes. The selected modulation format and the selected spectral shape are provided for the optical transmitter 200 through the signal 103.

The serializer/deserializer 110 converts the logical binary stream 101 into parallel bit streams for a Digital Signal Processing (DSP) unit 230. The DSP unit 230 processes the data output by the serializer/deserializer 110 in order to generate two analog signals which are respectively amplified by the drivers 112 and 113. The outputs of the respective drivers 112 and 113 are used in order to modulate the light emitted by the laser 111 by means of the IQ modulator 140.

The DSP 230 includes the coding section 131, which is set by a control unit 215 according to the signal 103. The output of the coding section 131 is processed by the digital filter 132, which is set according to a corresponding signal emitted by the control unit 215 as a function of the signal 103. The output of the digital filter 132 is processed by the pre-compensation unit 133. The setting parameters of the pre-compensation unit 133 are controlled by the control unit 215, which sets the parameters of the pre-compensation depending on the information on the transmission line where the optical signal 202 is transmitted.

An adjustment unit 234 performs multiplication and clipping on the digital signal output by the pre-compensation unit 133. The parameters of the adjustment unit 234 are changed when the control unit 215 orders the reconfiguration of the optical transmitter 200. The order for the reconfiguration includes changing the selected modulation format and the selected filtering format. The parameters of the adjustment unit 234 are calculated depending on the configurations before and after a reconfiguration event.

An ABC DSP unit 237 generates low frequency components appearing after modulation of the optical signal 202. The ABC DSP unit 237 also controls the ABC circuit 114. The ABC circuit 114 controls the three DC biases of the IQ modulator 140 according to the low frequency component imprinted by the ABC DSP unit 237 on the optical signal 202.

The front-end compensation unit 135 can compensate the bandwidth limitation of the optical front-end. The digital signal output of the front-end compensation unit 135 is converted by the DAC 136 into analog signals to be amplified by the drivers 112 and 113.

The control unit 215 sets the modulation format and filtering characteristics of the optical transmitter 200 according to the signal 103. The signal 103 is susceptible to a change depending on the transmission characteristics of the transmission line through which the optical signal 102 is transmitted, on the network condition, or on the conditions of the optical transmitter 200 or a receiver receiving the optical signal 202.

When the signal 103 is changed, the control unit 215 can reconfigure the optical transmitter 200. The control unit 215 transmits to a calculation unit 218 the information on the selected modulation format and the selected filtering setting after the reconfiguration event. The calculation unit 218 has therefore the information on not only the currently selected modulation format and the selected filtering setting but also the selected modulation format and the selected filtering setting after the reconfiguration event. The control unit 215 and the calculation unit 218 can be integrated in the DSP unit 230.

At the reconfiguration event, synchronized by the control unit 215, the calculation unit 218 calculates multiplication coefficients and clipping coefficients to be applied after the reconfiguration event, depending on the multiplication coefficients and the clipping coefficients that had been applied before the reconfiguration event.

The information calculated by the calculation unit 218 is passed to the adjustment unit 234 when a reconfiguration event occurs. This information includes a multiplying coefficient and a clipping ratio, which are used to process the digital signals output by the pre-compensation unit 133.

The coefficients calculated by the calculation unit 218 are chosen so that the average of the absolute voltage of the electrical signals output by the drivers 112 and 113 may become equal before and after the reconfiguration event.

In an alternative implementation of the present exemplary embodiment, the coefficients of the calculation unit 218 calculates coefficients and clipping ratios so as to reduce the difference between the average of the absolute voltage of the electrical signals output by the drivers 112 and 113 before and after the reconfiguration event.

In an alternative implementation of the present exemplary embodiment, the calculation unit 218 calculates the coefficients and clipping ratios so that the average of the square values of voltages of the electrical signals emitted by the drivers 112 and 113 may become equal before and after the reconfiguration event.

In an alternative implementation of the present exemplary embodiment, the calculation unit 218 also calculates the coefficients and clipping ratios depending on the information on the setting of the pre-compensation unit 133.

In an alternative implementation of the present exemplary embodiment, the calculation unit 218 is able to monitor elapsed time and updates its calculated values as a function of the elapsed time and of a set of the coefficient and the clipping ratio until the calculated values converge as a function of the elapsed time.

Next, a method for controlling the optical transmitter 200 will be described, referring to FIG. 5.

Figure 5:
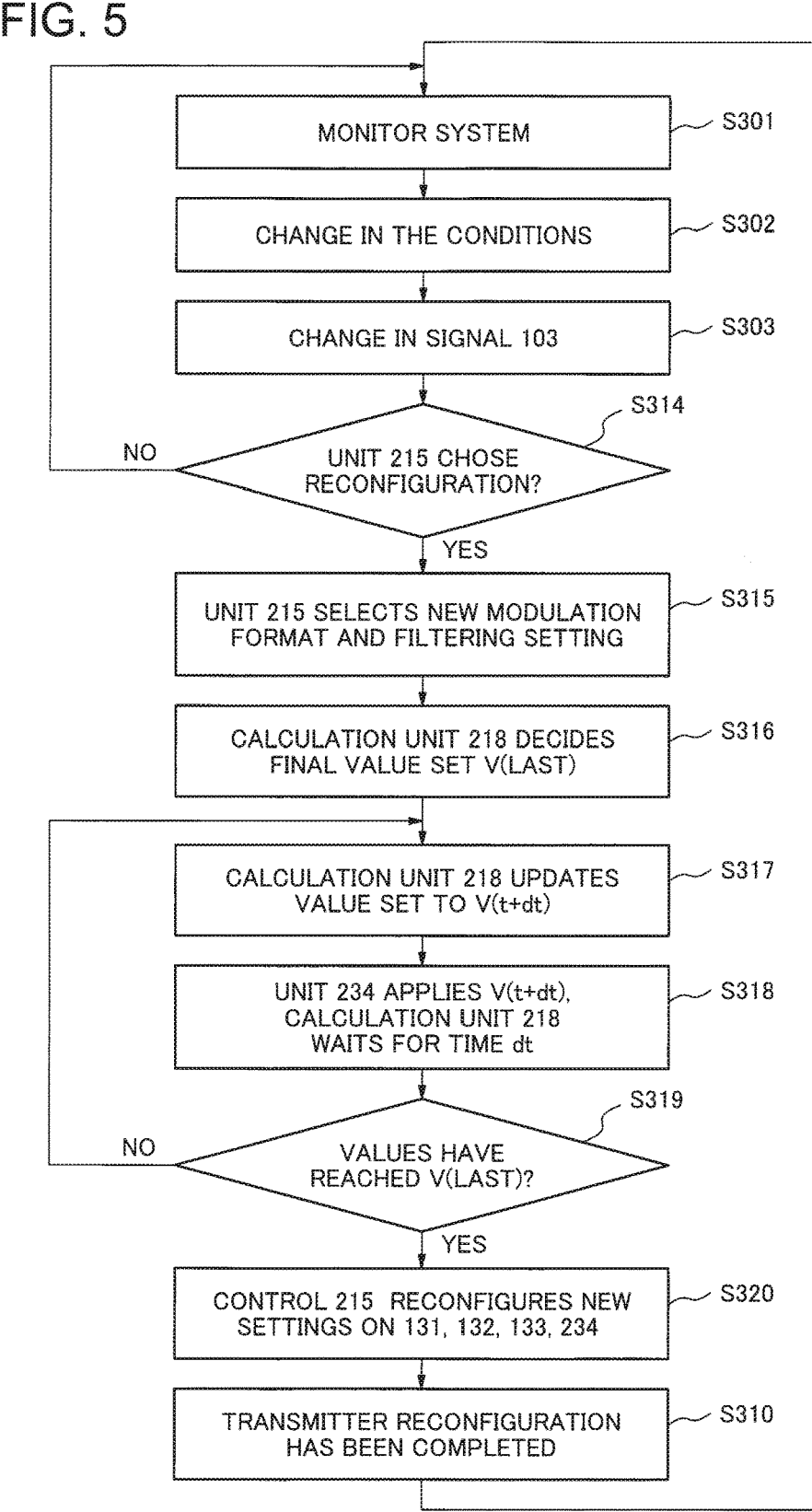
FIG. 5 is a flowchart illustrating a method for controlling the optical transmitter in accordance with the third exemplary embodiment of the present invention.

FIG. 5 is a flowchart illustrating a method for controlling the optical transmitter 200. In step S301, the system using the optical transmitter 200 has continuously been monitored until an event occurs at step S302. The event causes a change in the condition of the network in which the transmitter 200 is used. In step S303, according to the change of step S302, the signal 103 provided for the optical transmitter 200 by the network is changed.

Next, in step S314, the control unit 215 analyzes the signal 103 and decides whether or not it is necessary to reconfigure the optical transmitter 200. If the control unit 215 decides that a reconfiguration of the optical transmitter 200 is unnecessary (S314/NO), the system is being monitored again at step S301. In the case where a reconfiguration is necessary (S314/YES), in step S315, the control unit 215 choses new modulation format and filtering setting to accommodate the optical transmitter 200 to the change in the conditions of step S302.

Then, according to step S316, the calculation unit 218 calculates a set of coefficient and clipping ratio named V(Last) so that the value applied to the adjustment unit 234 may be V(Last) immediately before the reconfiguration event. Then, in step S317, the calculation unit 218 calculates a set of value V(t+dt) between the current values applied to the adjustment unit 234 and the value set V(Last). The set of value V(t+dt) can be calculated by the linear interpolation between the values applied to the adjustment unit 234 and the set V(Last) for an elapsed time interval of dt. The elapsed time interval dt is chosen so that the ABC circuit 114 may be able to adjust to variations of the controlled biases of the IQ modulator 140 within the time dt. In step S318, the adjustment unit 234 applies the set of value V(t+dt) calculated by the calculation unit 218 and the calculation unit 218 waits for the elapsed time interval dt.

Then, in step S319, the calculation unit 218 checks if the calculated value set V(t+dt) has reached V(Last). If the set values have not reached V(Last) (S319/NO), the calculation unit 218 calculates a new set of value between the current set values and V(Last) by performing step S317. If the set of value V(Last) has been reached (S319/YES), the optical transmitter 200 is controlled by step S320 where the control unit 215 applies the selected configuration to the units 131, 132, and 133 in the DSP unit 230. Additionally, the adjustment unit 234 applies new values calculated by the calculation unit 218 according to the reconfiguration decided by the control unit 215. According to the present exemplary embodiment, the optical signal 202 becomes optimal at the reconfiguration step S320 and in the subsequent time. Finally, at step S310, the reconfiguration has been completed and the system is being monitored again in step S301.

Next, another method for controlling the optical transmitter 200 will be described, referring to FIG. 6.

Figure 6:
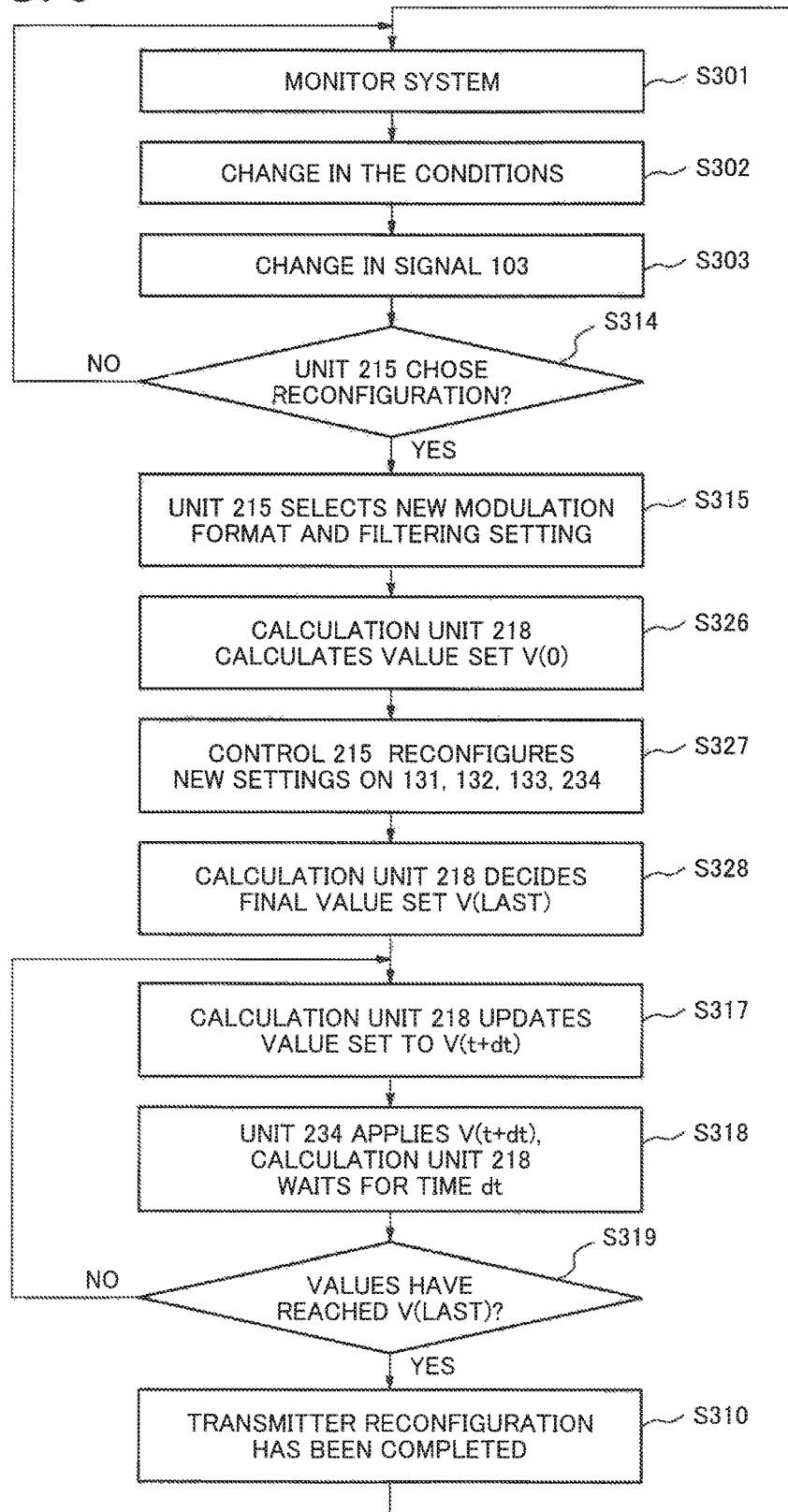
FIG. 6 is a flowchart illustrating another method for controlling the optical transmitter in accordance with the third exemplary embodiment of the present invention.

FIG. 6 is a flowchart illustrating another method for controlling the optical transmitter 200. In step S301, the system using the optical transmitter 200 has continuously been monitored until an event occurs at step S302. The event causes a change in the condition of the network in which the transmitter 200 is used. In step S303, according to the change of step S302, the signal 103 provided for the optical transmitter 200 by the network is changed.

Next, in step S314, the control unit 215 analyzes the signal 103 and decides whether or not it is necessary to reconfigure the optical transmitter 200. If the control unit 215 decides that a reconfiguration of the optical transmitter 200 is unnecessary (S314/NO), the system is being monitored again at step S301. In the case where a reconfiguration is necessary (S314/YES), in step S315, the control unit 215 chooses new modulation format and filtering setting to accommodate the optical transmitter 200 to the change in the conditions of step S302.

Then, according to step S326, the calculation unit 218 calculates a set of coefficient and clipping ratio named V(0). Then, in step S327, the control unit 215 applies the selected configuration to the units 131, 132, and 133 in the DSP unit 230. Additionally, the adjustment unit 234 applies new values calculated by the calculation unit 218 according to the reconfiguration decided by the control unit 215 and the value set V(0). According to the present exemplary embodiment, the optical signal 202 becomes optimal at the reconfiguration step S327 and in the subsequent time.

Then, in step S328, the calculation unit 218 calculates a value set V(Last) according to the properties of the optical transmitter 200 so that the emitted optical signal 202 and the optical transmitter 200 may become optimal configurations for the selected modulation format and filter setting. Then, in step S317, the calculation unit 218 calculates a set of value V(t+dt) between the current values applied to the adjustment unit 234 and the value set V(Last). The set of value V(t+dt) can be calculated by the linear interpolation between the values applied to the adjustment unit 234 and the set V(Last) for an elapsed time interval of dt. The elapsed time interval dt is chosen so that the ABC circuit 114 may be able to adjust to variations of the controlled biases of the IQ modulator 140 within the time dt. In step S318, the adjustment unit 234 applies the set of value V(t+dt) calculated by the calculation unit 218 and the calculation unit 218 waits for the elapsed time interval dt.

Then, in step S319, the calculation unit 218 checks if the calculated value set V(t+dt) has reached V(Last). If the set values have not reached V(Last) (S319/NO), the calculation unit 218 calculates a new set of value between the current set values and V(Last) by performing step S317. If the set of value V(Last) (S319/YES), the reconfiguration has been completed at step S310 and the system is being monitored again as in step S301.

[The Fourth Exemplary Embodiment]

Figure 7:
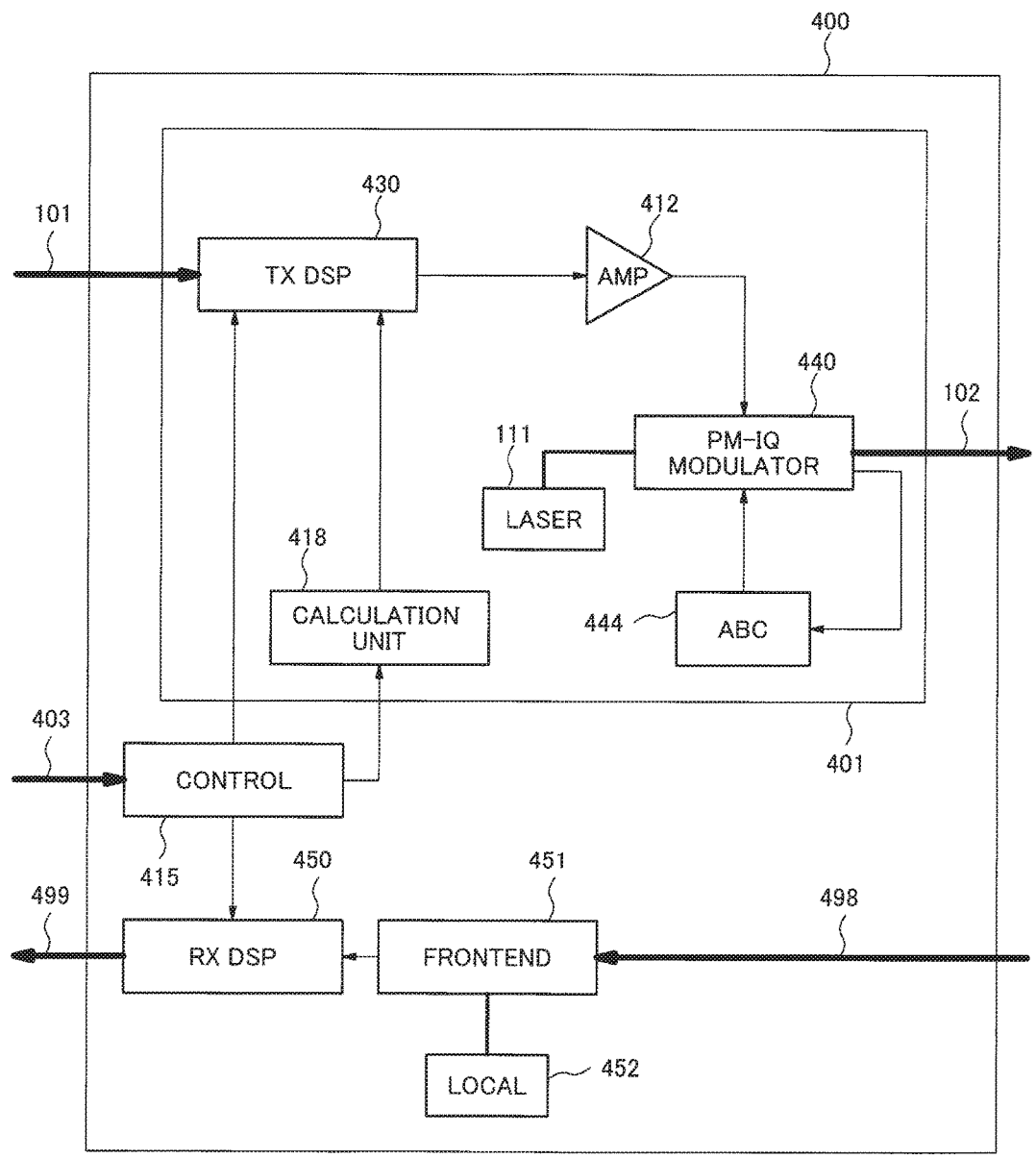
FIG. 7 is a block diagram showing the configuration of an optical transponder in accordance with the fourth exemplary embodiment of the present invention.

Next, the fourth exemplary embodiment of the present invention will be described. FIG. 7 is a block diagram showing the configuration of an optical transponder 400. The optical transponder 400 emits the optical signal 102 according to the logical binary stream 101. The optical transponder 400 also receives an optical signal 498 and generates a data stream 499 by means of the reception and the demodulation of the optical signal 498.

The optical transponder 400 includes an optical transmitter 401. The optical transmitter 401 includes a polarization multiplexed (PM-) IQ modulator 440. The PM-IQ modulator 440 includes two IQ modulators, each of which is similar to the IQ modulator 140, modulating two polarization of the lightwave emitted by the laser 111.

The logical binary stream 101 is processed by a transmitter DSP 430 of a DSP for the optical transmitter 401. The transmitter DSP 430 is similar to the DSP unit 230 except that it performs a signal processing for two polarizations of the optical signal 102. The output of the transmitter DSP 430 includes four analog tributaries, which are amplified by a quadratic driver 412 to drive both polarizations of I and Q children modulators in the PM-IQ modulator 440.

The PM-IQ modulator 440 is controlled by an ABC circuit 444. The ABC circuit 444 includes two ABC circuits, each of which is similar to the ABC circuit 114 and is used for each polarization of the PM-IQ modulator 440. A calculation unit 418 calculates values set for the signal processes of the both polarizations in the transmitter DSP 430 as is the case in the calculation unit 218.

The optical transponder 400 also includes an optical frontend 451, which mixes the received optical signal 498 and the light from a local oscillator 452 in a coherent manner. The output of the optical frontend 451 is digitalized and processed by a receiver DSP 450. The data stream resulting from the processing and the demodulation by the receiver DSP 450 is equal to the data stream 499. The transmitter DSP 430 and the receiver 450 can be integrated.

A control unit 415 reconfigures the selected modulation format and the filtering characteristics of the transmitter DSP 430 and the receiver DSP 450 according to a signal 403 which changes depending on network conditions, path conditions, and equipment conditions. For instance, the control unit 415 is able to select between PM-BPSK, PM-QPSK, PM-8QAM, PM-16QAM, and PM-64QAM modulation formats. In addition, the control unit 415 is able to select between an NRZ shaping and a Nyquist pulse shaping.

The optical transponder 400 can be used as a sub-carrier generator within a multicarrier transponder. For instance, a 1 Tb/s optical transponder can be implemented with 10 sub-carriers generated with optical transponders, each of which is identical to the optical transponder 400 and emits 128 Gb/s PM-QPSK signals. The optical transponder can emit NRZ shaped signals or Nyquist pulse shaped signals. A 1 Tb/s optical transponder can be also implemented with 5 sub-carriers generated with optical transponders, each of which is identical to the optical transponder 400 and emits 256 Gb/s PM-16QAM signals. The optical transponder can emit NRZ shaped signals or Nyquist pulse shaped signals.

Next, the results of an experimental emulation will be described.

Figure 8:
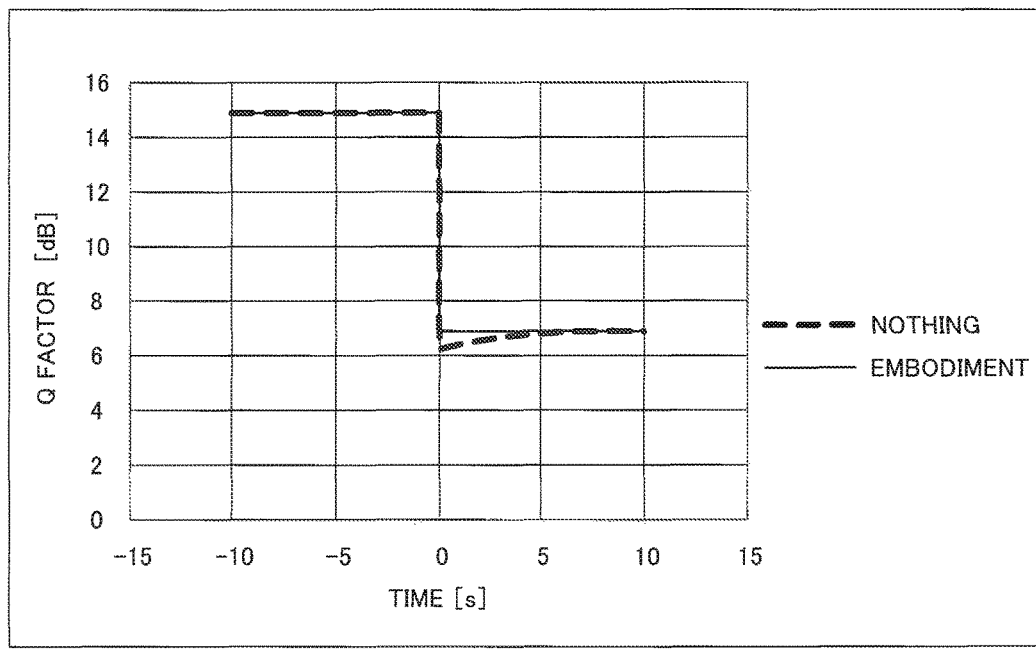
FIG. 8 is a diagram illustrating the results of an experimental emulation of the reconfiguration using the optical transponder in accordance with the fourth exemplary embodiment of the present invention.

FIG. 8 is a diagram illustrating the results of an experimental emulation of the reconfiguration using the optical transponder 400. The solid line represents the evolution of the Q factor of the received optical signal 102 during an event of reconfiguration using the present exemplary embodiment. This is compared to the broken line which represents the evolution of the Q factor during the same event without using the present exemplary embodiment.

The optical transmitter emits signals at 32 Gbaud and it is reconfigured at time 0 from PM-QPSK to PM-16QAM. Before the time represented as 0, the optical transmitter emits 128 Gb/s PM-QPSK signal and then it emits 256 Gb/s PM-16QAM signal after the time represented as 0. The multiplying factor calculated by the calculation unit 418 is equal to 1.54. During the time between 0 and 10 s, the optical transmitter according to the present exemplary embodiment enables to increase the received Q factor compared to the implementation without using the present exemplary embodiment. In addition, for the time represented as 0, the present exemplary embodiment enables to pass over a threshold of 6.4 dB of the Q factor.

Figure 9:
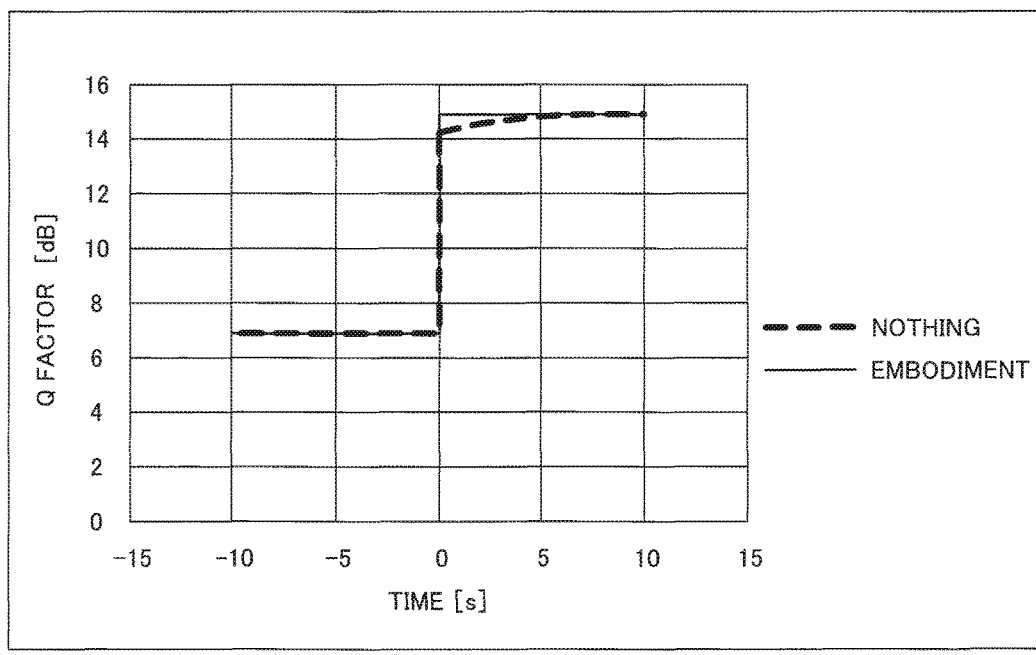
FIG. 9 is a diagram illustrating other results of an experimental emulation of the reconfiguration using the optical transponder in accordance with the fourth exemplary embodiment of the present invention.

FIG. 9 is a diagram illustrating the results of an experimental emulation of the reconfiguration using the optical transponder 400. The solid line represents the evolution of the Q factor of the received optical signal 102 during an event of reconfiguration using the present exemplary embodiment. This is compared to the broken line which represents the evolution of the Q factor during the same event without using the present exemplary embodiment.

The optical transmitter emits signals at 32 Gbaud and it is reconfigured at time 0 from PM-16QAM to PM-QPSK. Before the time represented as 0, the optical transmitter emits 256 Gb/s PM-16QAM signal and then it emits 128 Gb/s PM-QPSK signal after the time represented as 0. The multiplying factor calculated by the calculation unit 418 was 0.65. During the time between 0 and 10 s, the optical transmitter according to the present exemplary embodiment enables to increase the received Q factor compared to the implementation without using the present exemplary embodiment.

Figure 10A:
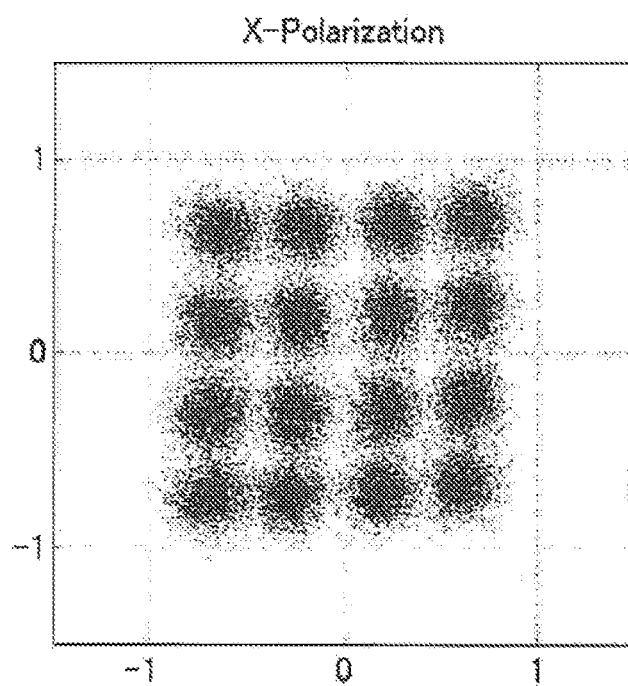
FIG. 10A is a diagram illustrating the constellation for X-polarization of the received optical signal of an optical transmitter after reconfiguration without using the optical transponder in accordance with the fourth exemplary embodiment of the present invention.
Figure 10B:
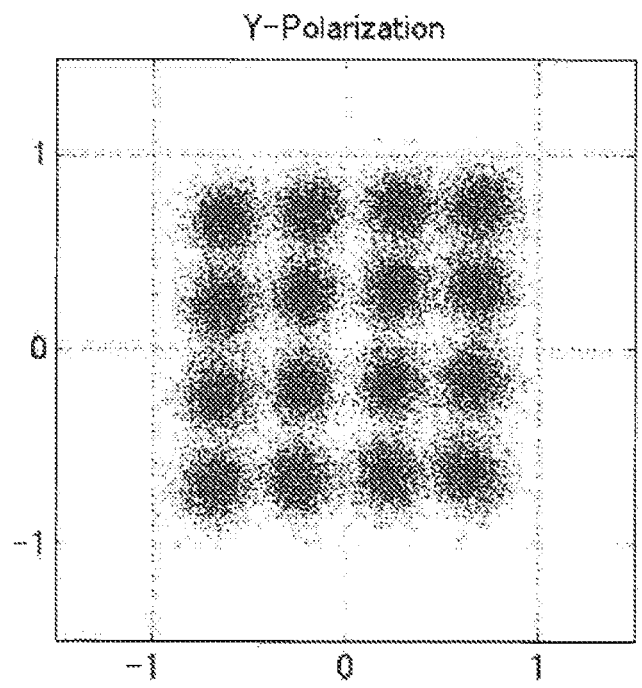
FIG. 10B is a diagram illustrating the constellation for Y-polarization of the received optical signal of an optical transmitter after reconfiguration without using the optical transponder in accordance with the fourth exemplary embodiment of the present invention.

FIG. 10A and FIG. 10B are diagrams illustrating the constellation of the received optical signal of an optical transmitter after reconfiguration to PM-16QAM at the time corresponding to the time 0 shown in FIG. 8 without using the present exemplary embodiment. FIG. 10A illustrates the constellation for X-polarization and FIG. 10B illustrates the constellation for Y-polarization.

The constellation is deformed and the PM-16QAM are not optimally placed on the IQ plane because the DC bias voltages of the PM-IQ modulator 440 are not optimally controlled by the ABC circuit 444 during the interval between 0 s and 10 s. This leads to additional penalty in Q factor in this interval as shown in FIG. 8.

Figure 11A:
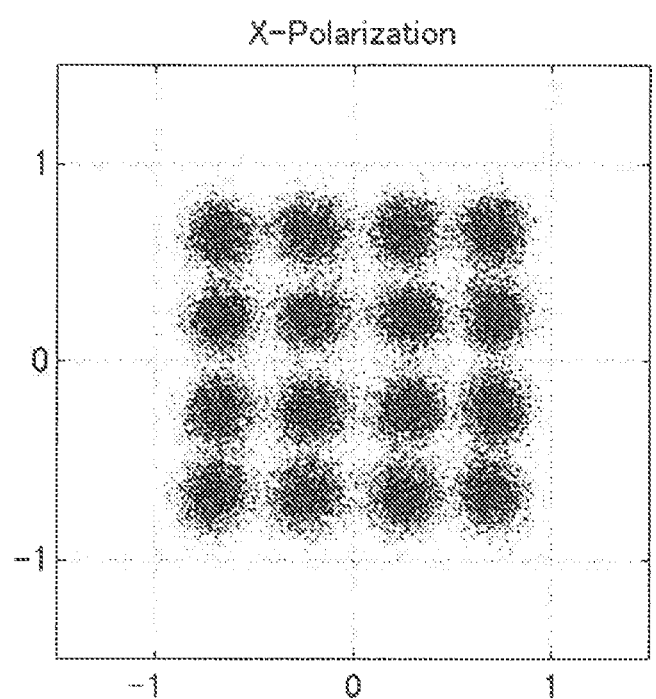
FIG. 11A is a diagram illustrating the constellation for X-polarization of the received optical signal of the optical transmitter after reconfiguration using the optical transponder in accordance with the fourth exemplary embodiment of the present invention.
Figure 11B:
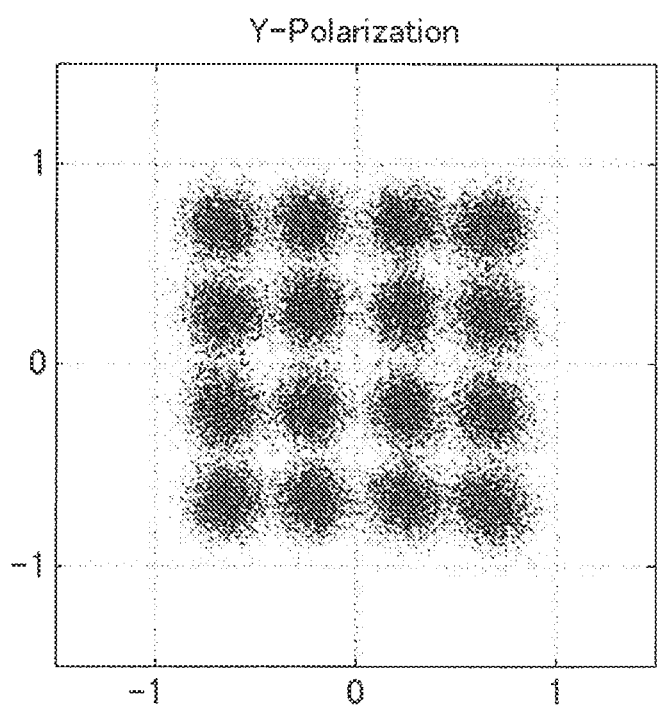
FIG. 11B is a diagram illustrating the constellation for Y-polarization of the received optical signal of the optical transmitter after reconfiguration using the optical transponder in accordance with the fourth exemplary embodiment of the present invention.

FIG. 11A and FIG. 11B are diagrams illustrating the constellation of the received optical signal 102 of the optical transmitter 400 after reconfiguration to PM-16QAM at the time corresponding to the time 0 of FIG. 8 using the present exemplary embodiment. FIG. 11A illustrates the constellation for X-polarization and FIG. 11B illustrates the constellation for Y-polarization.

The constellation has better symbol placement because the DC bias voltages of the PM-IQ modulator 440 are optimally controlled by the ABC circuit 444 during the interval between 0 s and 10 s. This leads to optimal Q factor after the reconfiguration as shown in FIG. 8.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

This invention can be applied to an optical communication system which utilizes digital signal processing technologies.

REFERENCE SIGNS LIST

10, 100, 200, 401 optical transmitter
20 modulator
30 digital signal processing (DSP) unit
40 controller
101 logical binary stream
102, 202, 498 optical signal
103, 403 signal
110 serializer/deserializer
111 laser
112, 113 driver
114, 444 ABC circuit
115, 215, 415 control unit
116, 117 memory
118 lookup table
130, 230 DSP unit
131 coding section
132 digital filter
133 pre-compensation unit
134, 234 adjustment unit
135 front-end compensation unit
136 DAC
140 IQ modulator
141, 142 child Mach-Zehnder modulator (MZM)
143 phase adjustment section
144 monitor photodiode (PD)
218, 418 calculation unit
237 ABC DSP unit
400 optical transponder
412 quadratic driver
430 transmitter DSP
440 polarization multiplexed IQ modulator (PM-IQ modulator)
450 receiver DSP
451 optical frontend
452 local oscillator
499 data stream

What is claimed is:

1. A method for controlling an optical transmitter, comprising the steps of:
   modulating light by a driving signal with a reconfigurable format;
   processing digital data to be transmitted by using parameters in order to generate the driving signal; and
   controlling the step of processing digital data by means of changing the parameters so as to keep the driving signal stable before and after changing the reconfigurable format, wherein,
   the reconfigurable format comprises a modulation format and a filtering format; and
   the parameters comprises a multiplying coefficient and a clipping ratio for the digital data.

2. The method for controlling an optical transmitter according to claim 1, wherein,
   in the step of controlling, the parameters are changed so that an average of an absolute voltage of the driving signal becomes equal before and after changing the reconfigurable format.

3. The method for controlling an optical transmitter according to claim 1, wherein,
   in the step of controlling, the parameters are changed so that the difference between an average of an absolute voltage of the driving signal may be reduced before and after changing the reconfigurable format.

4. The method for controlling an optical transmitter according to claim 1, wherein,
   in the step of controlling, the parameters are changed so that an average of a square value of a voltage of the driving signal becomes equal before and after changing the reconfigurable format.

5. The method for controlling an optical transmitter according to claim 1, wherein,
   in the step of controlling, the parameters are changed so that an average of an absolute voltage of the driving signal becomes equal before and after changing the reconfigurable format.

6. The method for controlling an optical transmitter according to claim 1, wherein,
in the step of controlling, the parameters are changed so that the difference between an average of an absolute voltage of the driving signal may be reduced before and after changing the reconfigurable format.

7. The method for controlling an optical transmitter according to claim 1, wherein,
in the step of controlling, the parameters are changed so that an average of a square value of a voltage of the driving signal becomes equal before and after changing the reconfigurable format.

8. An optical transmitter, comprising:
a modulation unit modulate light by a driving signal with a reconfigurable format;
a digital signal processing unit to process digital data to be transmitted by using parameters in order to generate the driving signal;
a control unit control the digital signal processing unit by means of changing the parameters so as to keep the driving signal stable before and after changing the reconfigurable format; and
a lookup table storing the parameters,
wherein the parameters comprises a multiplying coefficient and a clipping ratio for the digital data.

9. The optical transmitter according to claim 8, further comprising a calculation unit configured to calculate the parameters to be applied after changing the reconfigurable format depending on the parameters having been applied before changing the reconfigurable format,
wherein the parameters comprises a multiplying coefficient and a clipping ratio for the digital data.

10. The optical transmitter according to claim 8,
wherein the control unit controls the digital signal processing unit by means of changing the parameters so that an average of an absolute voltage of the driving signal becomes equal before and after changing the reconfigurable format.

11. The optical transmitter according to claim 8,
wherein the control unit controls the digital signal processing unit by means of changing the parameters so that the difference between an average of an absolute voltage of the driving signal may be reduced before and after changing the reconfigurable format.

12. The optical transmitter according to claim 8,
wherein the control unit controls the digital signal processing unit by means of changing the parameters so that an average of an absolute voltage of the driving signal becomes equal before and after changing the reconfigurable format.

13. The optical transmitter according to claim 8,
wherein the control unit controls the digital signal processing unit by means of changing the parameters so that the difference between an average of an absolute voltage of the driving signal may be reduced before and after changing the reconfigurable format.

* * * * *